W. F. & J. BARNES.
Mechanical Movement

No. 164,414.

Patented June 15, 1875.

WITNESSES
H. H. Young
Wm J. Peyton

INVENTORS
Wm F. and John Barnes.
By their Attorney
Wm D. Baldwin

UNITED STATES PATENT OFFICE.

WILLIAM F. BARNES AND JOHN BARNES, OF ROCKFORD, ILLINOIS.

IMPROVEMENT IN MECHANICAL MOVEMENTS.

Specification forming part of Letters Patent No. 164,414, dated June 15, 1875; application filed May 17, 1875.

CASE B.

*To all whom it may concern:*

Be it known that we, WILLIAM F. BARNES and JOHN BARNES, both of Rockford, in the county of Winnebago and State of Illinois, have invented certain new and useful Improvements in Mechanical Movements, of which the following is a specification:

The object of our invention is to convert an oscillating or treadle motion into a continuous rotary motion, which is more especially designed for driving scroll-saws, hand-lathes, and such other light machinery, for which a quick motion is desired.

The invention consists in mounting upon a stud-axle or shaft a sleeve provided with a pawl, the pawl being also provided with a short arm extending laterally therefrom, which fits into an opening in an idle-ring, which revolves on a prepared surface of the wheel or pulley to which the rotary motion is to be imparted, the friction of said idle-ring controlling the movements of the pawl, as will be hereinafter more fully described.

Figure 1:
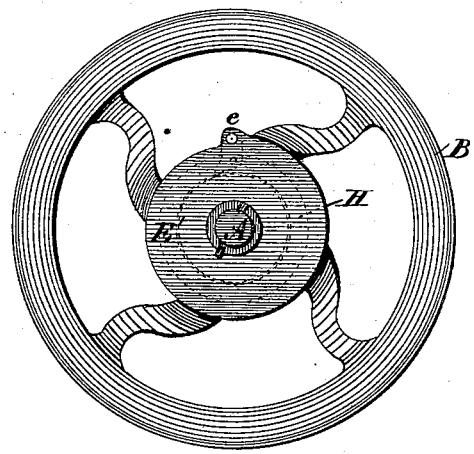
Figure 2:
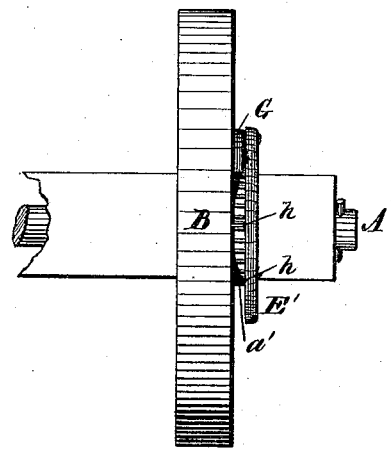
Figure 3:
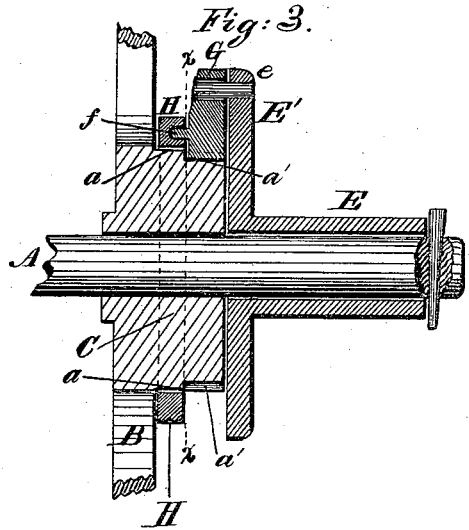
Figure 4:
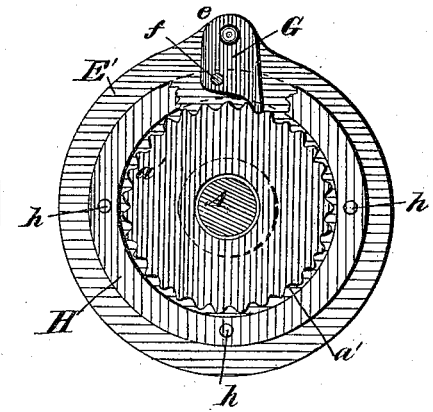

In the drawings, Figure 1 is an end view of the mechanism and shaft upon which it is mounted; Fig. 2, a side view thereof; Fig. 3, a vertical longitudinal central section of the same, and Fig. 4 a cross-section on the line $x$ $x$ of Fig. 3.

A represents an axle or shaft, upon which is loosely mounted a wheel or pulley, B, the hub C of which is extended, so as to form the plain surface $a$ and notched surface $a'$, the object of which will be described. On this axle or shaft A, next to the extended hub portion C, is also loosely mounted a sleeve, E, provided with an annular rim, E', upon a projecting nose, $e$, of which is pivoted a pawl, G, which is adapted to engage the teeth $a'$ on the periphery of the hub-extension. On the side of this pawl next to the wheel or pulley a lateral stud or arm, $f$, projects, its end entering an opening in the idle-ring H, which, in operation, revolves upon the plain surface $a$ of the hub-extension, and by its friction is intended to control or govern the movements of said pawl.

To prevent this idle controlling-ring H from slipping from its seat on the plain surface $a$ of the hub during its revolution, we provide it with projecting arms $h$ to abut or bear against the surface of the annular rim or flange E'.

In operation motion is imparted to the sleeve or thimble by any suitable means, preferably by treadle-power, such as shown in Letters Patent No. 146,636, granted William F. Barnes, January 20, 1874, the oscillating motion thus produced being converted into a rotary motion by the pawl engaging in the teeth on the hub-extension of the wheel, it being brought into contact therewith by means of the friction of the idle-ring working on the wheel-hub, the friction forcing the pawl immediately down into the nearest notch, and holding it there positively without the necessity of employing a spring. By stopping or reversing the forward motion of the sleeve or thimble a reverse action of the idle-ring is caused, which will lift the ratchet free of the notches, and carry it in that position until the imparting movement of the sleeve is again resorted to, when the pawl will again be forced to engage with the teeth, as before described.

We claim—

The mechanical movement hereinbefore described, consisting of the combination of a shaft, a driven wheel or pulley mounted thereon, a driving pulley or sleeve also mounted on said shaft, a pawl pivoted on the driving pulley or sleeve, and connected with and controlled by an idle-ring mounted upon the extended hub portion of the wheel or pulley, these members being constructed to operate in combination, substantially as set forth, whereby an oscillating or treadle motion may be converted into a continuous rotary motion.

In testimony whereof we have hereunto subscribed our names.

WILLIAM F. BARNES.
JOHN BARNES.

Witnesses:
PAUL F. MAYR,
CHRISTIAN HENERY.